May 4, 1926.  1,582,967
A. T. BROWN
TRACTOR FRAME FOR AGRICULTURAL MACHINES
Filed August 2, 1919  7 Sheets-Sheet 1
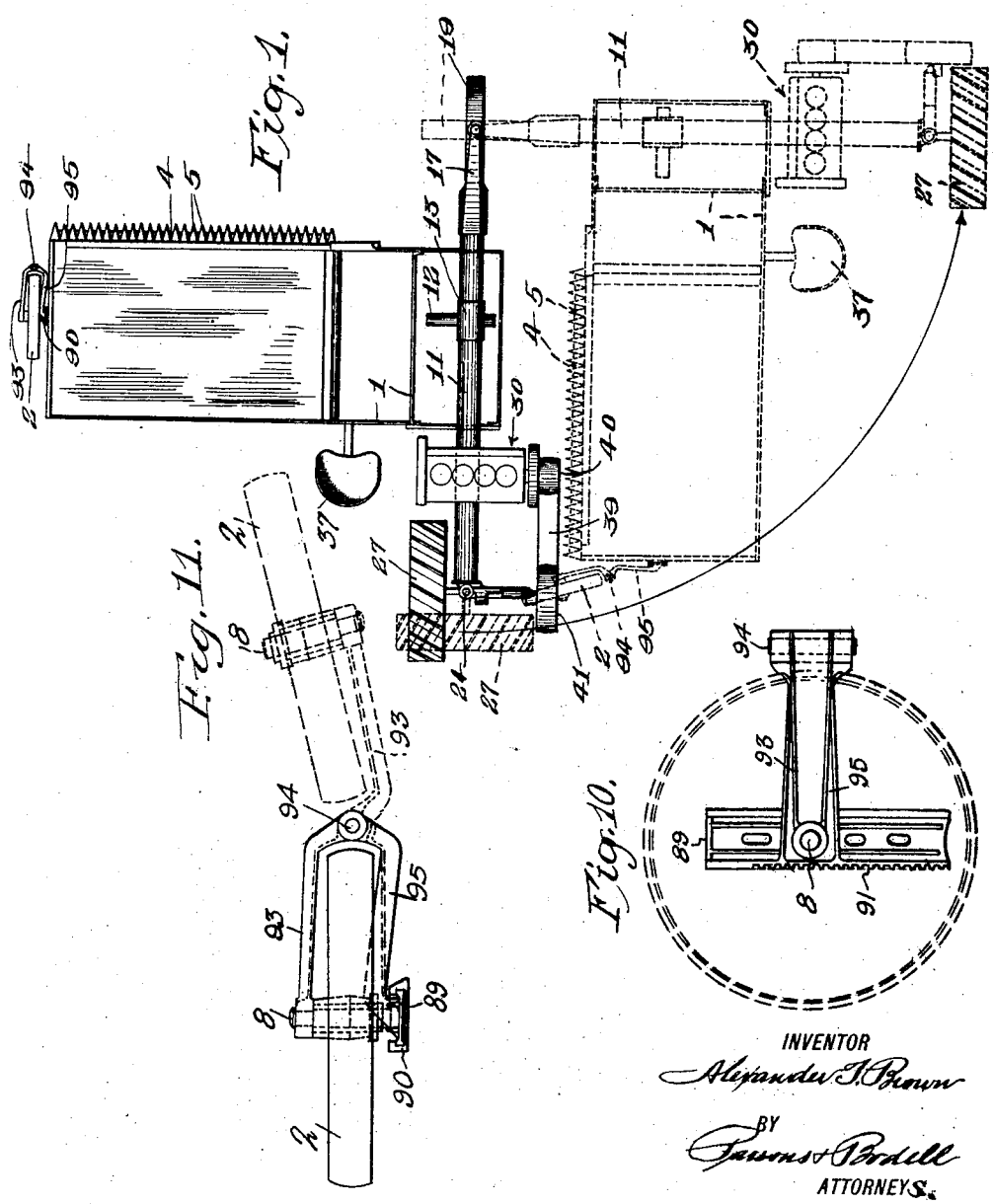
INVENTOR
Alexander T. Brown
BY
Parsons & Birdsell
ATTORNEYS May 4, 1926.
A. T. BROWN
1,582,967
TRACTOR FRAME FOR AGRICULTURAL MACHINES
Filed August 2, 1919 7 Sheets-Sheet 2
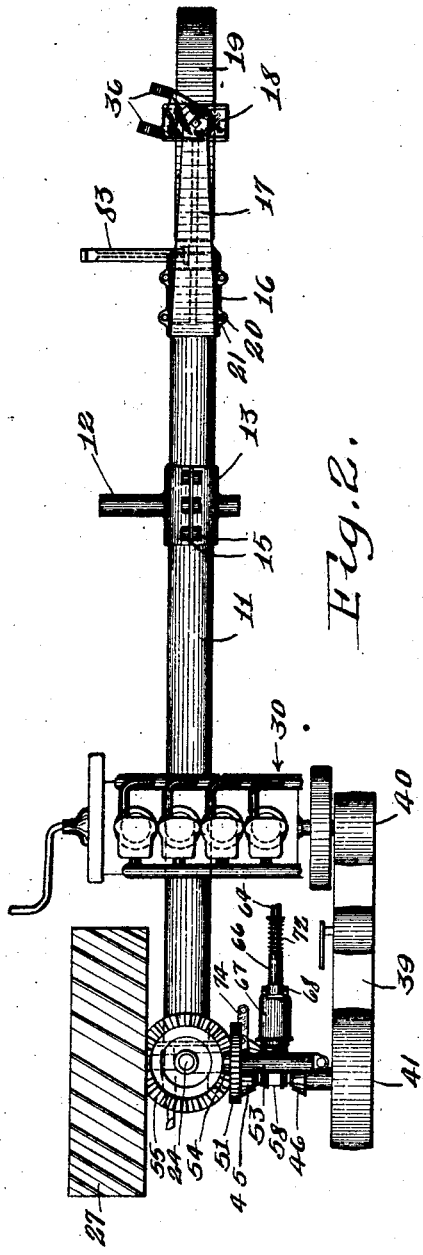
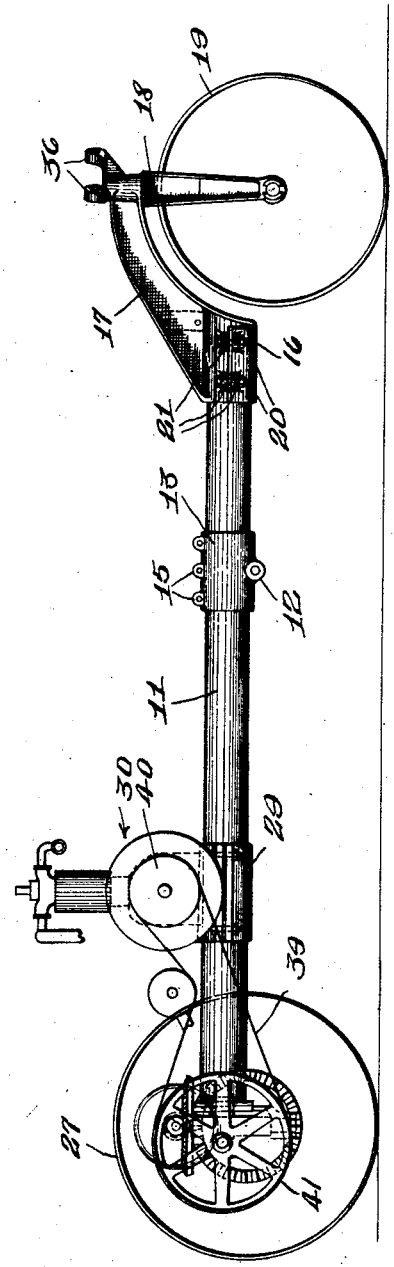
INVENTOR
Alexander T. Brown.
BY
Parsons & Bredell
ATTORNEYS.

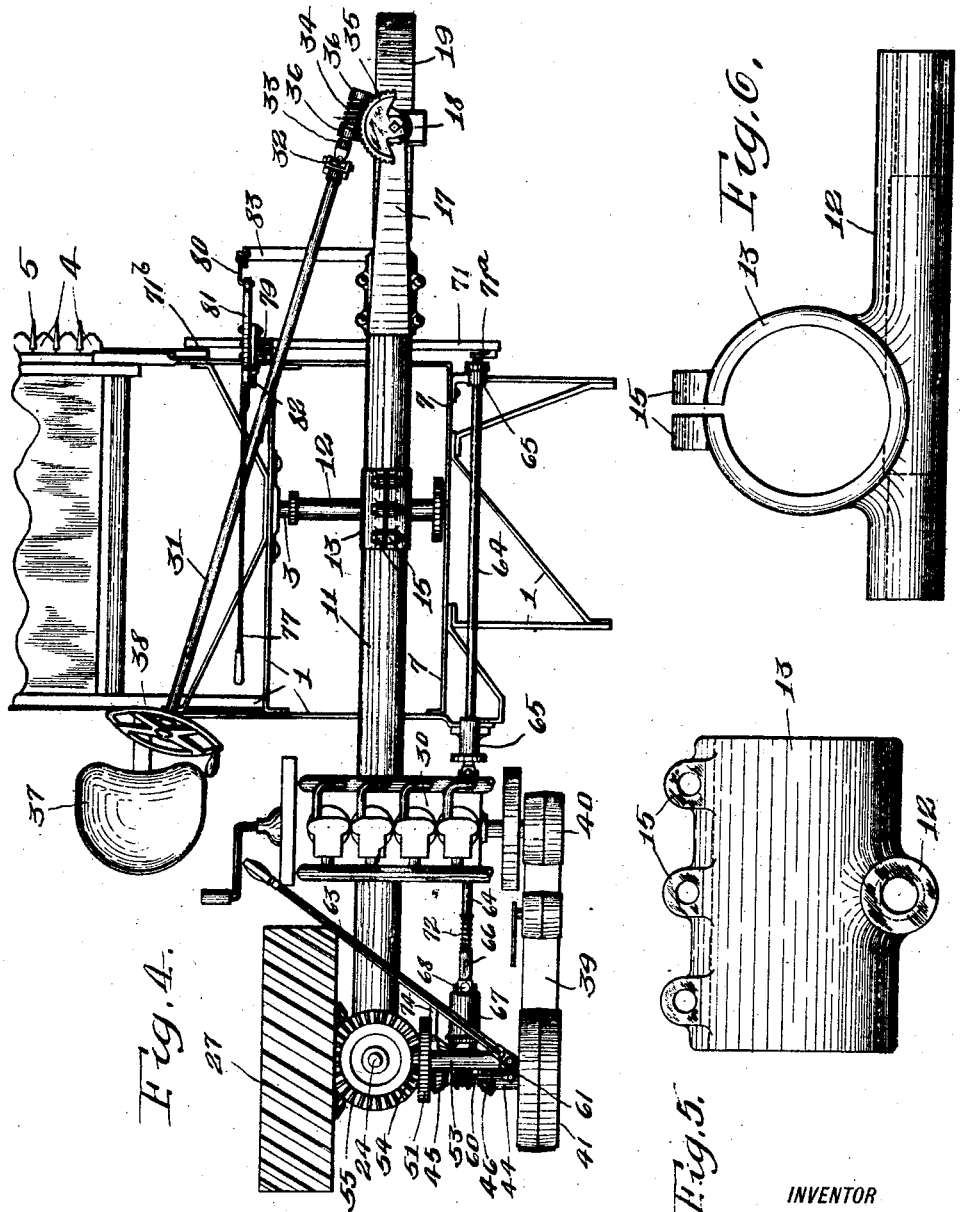

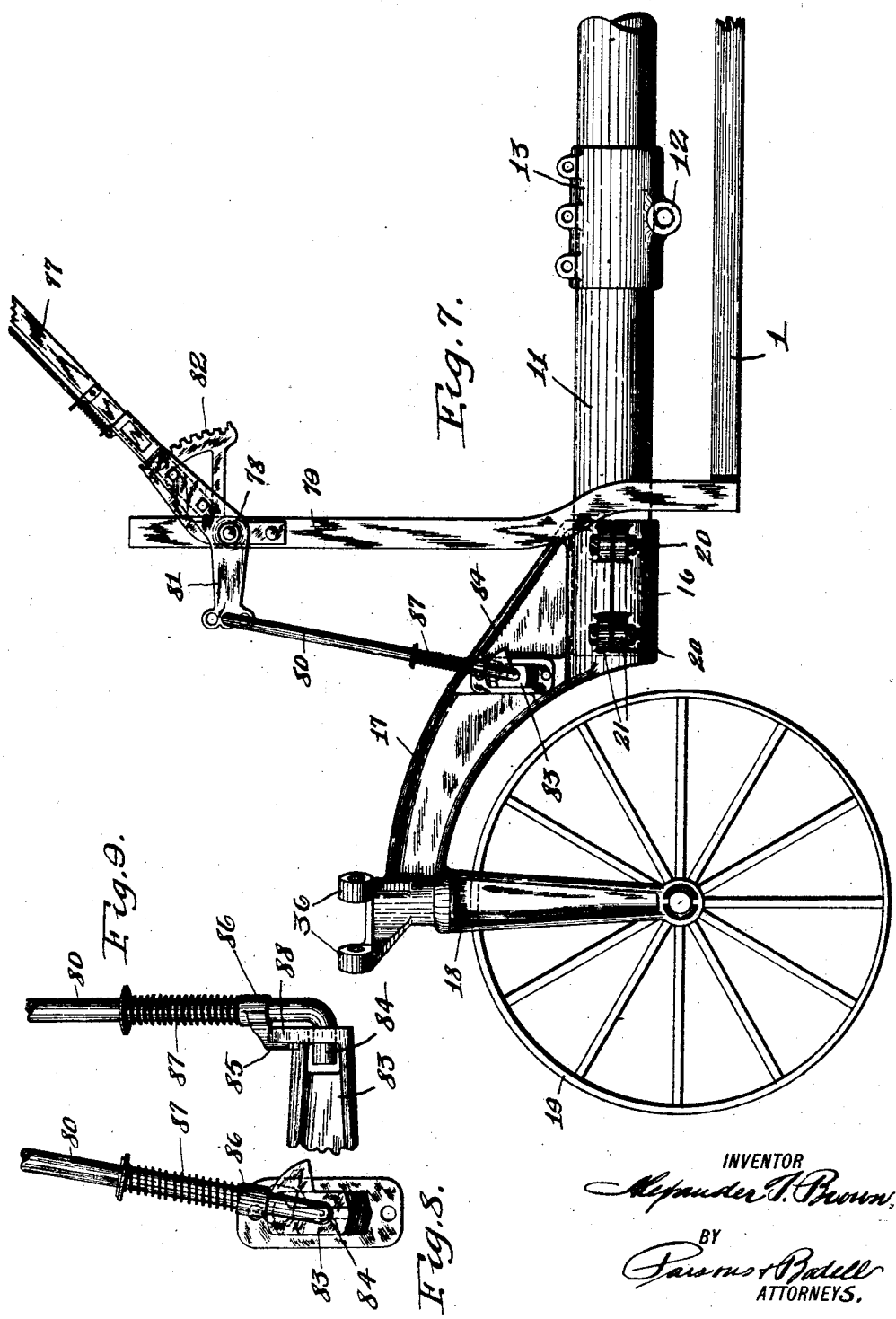

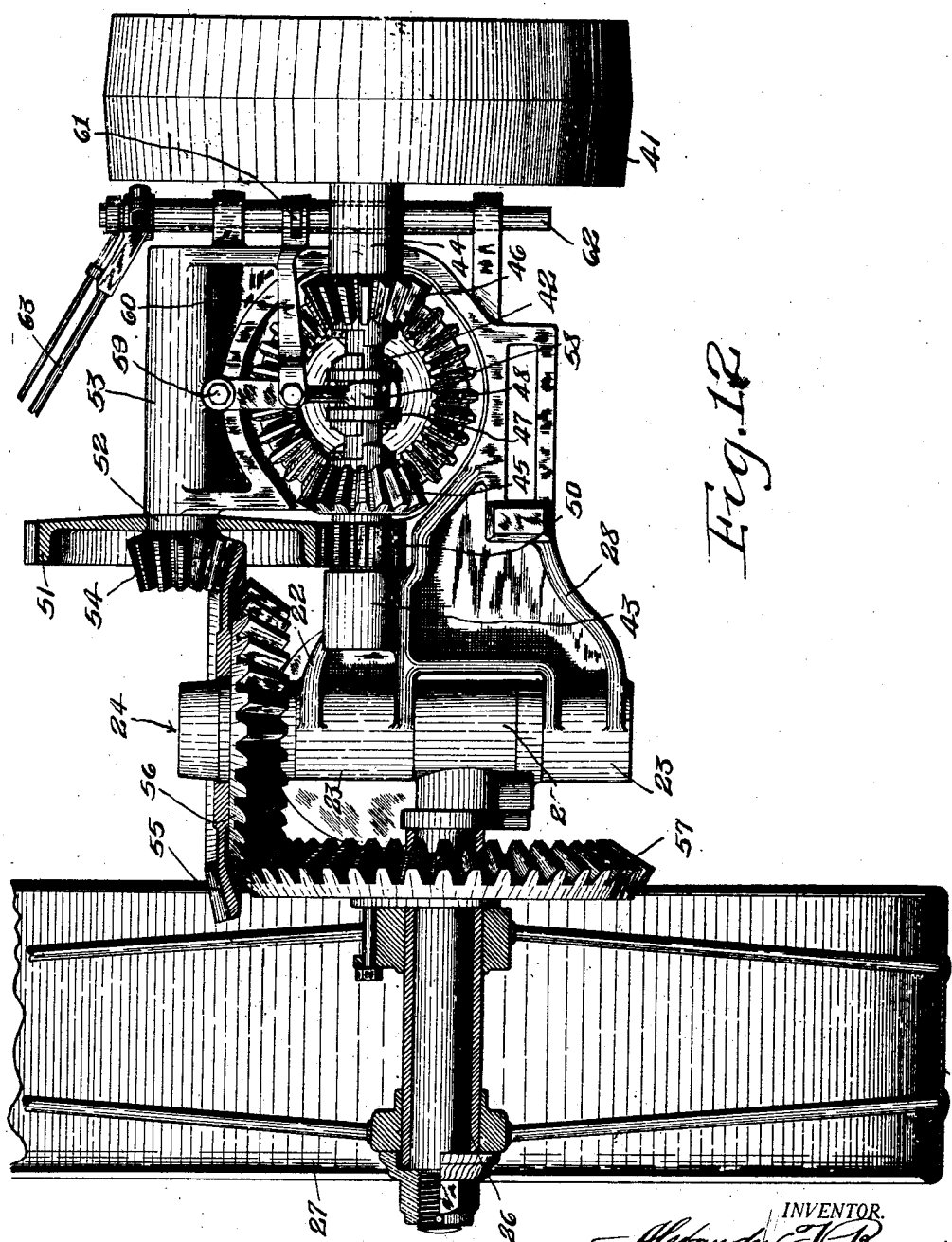

May 4, 1926.

A. T. BROWN 1,582,967

TRACTOR FRAME FOR AGRICULTURAL MACHINES

Filed August 2, 1919     7 Sheets-Sheet 6

INVENTOR.
Alexander T. Brown.
BY
Parsons & Bodell
ATTORNEYS.

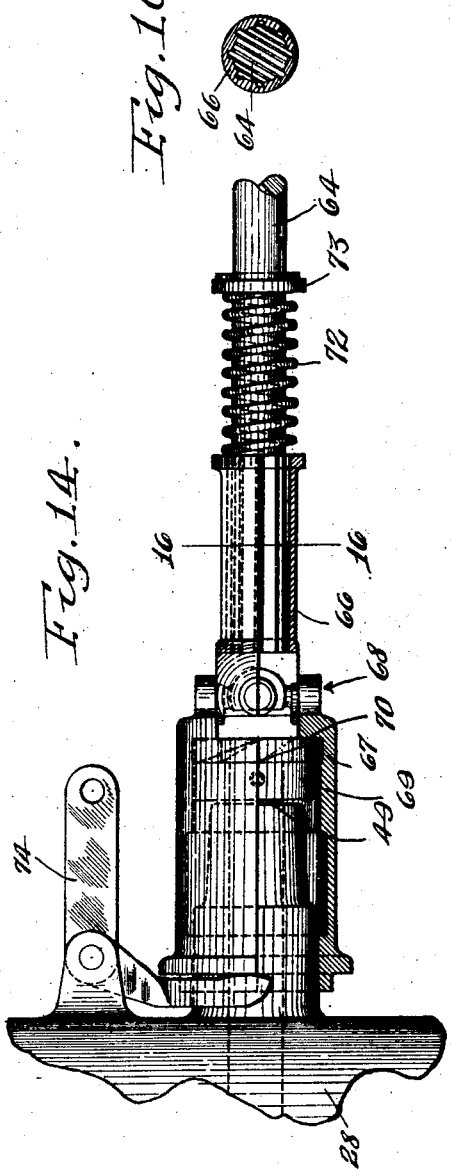
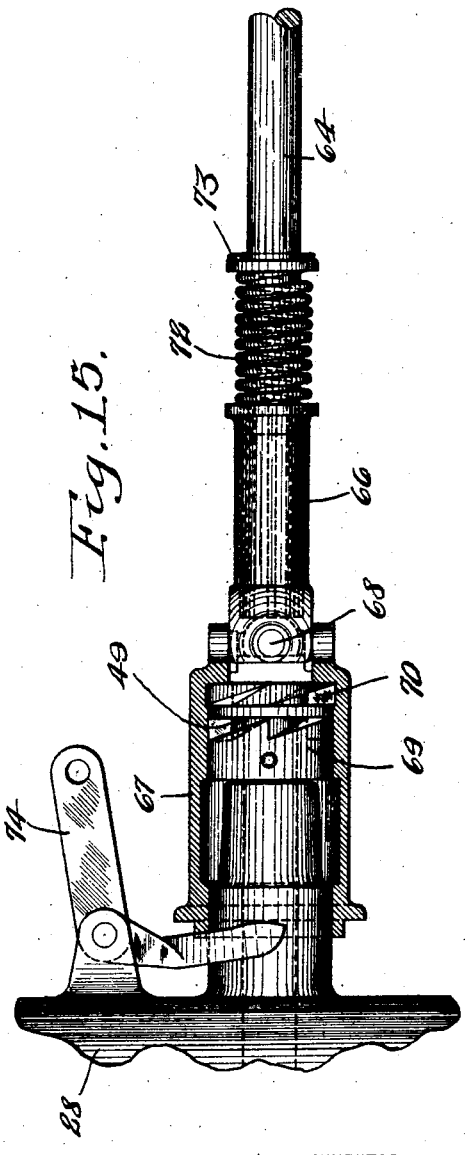

Patented May 4, 1926.

1,582,967

UNITED STATES PATENT OFFICE.

ALEXANDER T. BROWN, OF SYRACUSE, NEW YORK.

TRACTOR FRAME FOR AGRICULTURAL MACHINES.

Application filed August 2, 1919. Serial No. 315,003.

*To all whom it may concern:*

Be it known that I, ALEXANDER T. BROWN, a citizen of the United States, and a resident of Syracuse, in the county of Onondaga and State of New York, have invented a new and useful Tractor Frame for Agricultural Machines, of which the following is a specification.

This invention relates to agricultural machines and has for its object a tractor frame which can be attached to agricultural machines such as binders which are now built to be horse drawn, the tractor frame being particularly simple and economical in construction, readily applicable to standard agricultural implements and highly efficient and durable in use; the invention consists in the novel features and in the combinations and constructions hereinafter set forth and claimed.

In describing this invention, reference is had to the accompanying drawings in which like characters designate corresponding parts in all the views.

Figure 1 is a diagrammatic plan view of a machine embodying my invention, parts being omitted, the operation of the machine when turning a corner being illustrated in dotted lines.

Figures 2 and 3 are plan and side elevations, parts being omitted, of the tractor frame and parts carried thereby.

Figure 4 is a plan view of the frame and binder carried thereby, parts of the binder being omitted.

Figures 5 and 6 are respectively, a side and end elevation of the bearing for the pivot of the binder.

Figure 7 is an enlarged side elevation of the front end of the tractor frame showing the means for tilting the binder about its transverse pivot.

Figures 8 and 9 are enlarged fragmentary views illustrating in detail the connection between the main frame and the mechanism for tilting the binder about its transverse pivot.

Figures 10 and 11 are respectively a side elevation and a plan view of the grain or caster wheel at the outer side of the binder frame, the castering action of the wheel being illustrated in dotted lines in Fig. 11.

Figure 12 is a rear elevation of the bracket carried at the rear end of the main beam of the tractor frame and the power transmitting mechanism carried thereby, the contiguous part of the tractor wheel being also shown.

Figure 13:
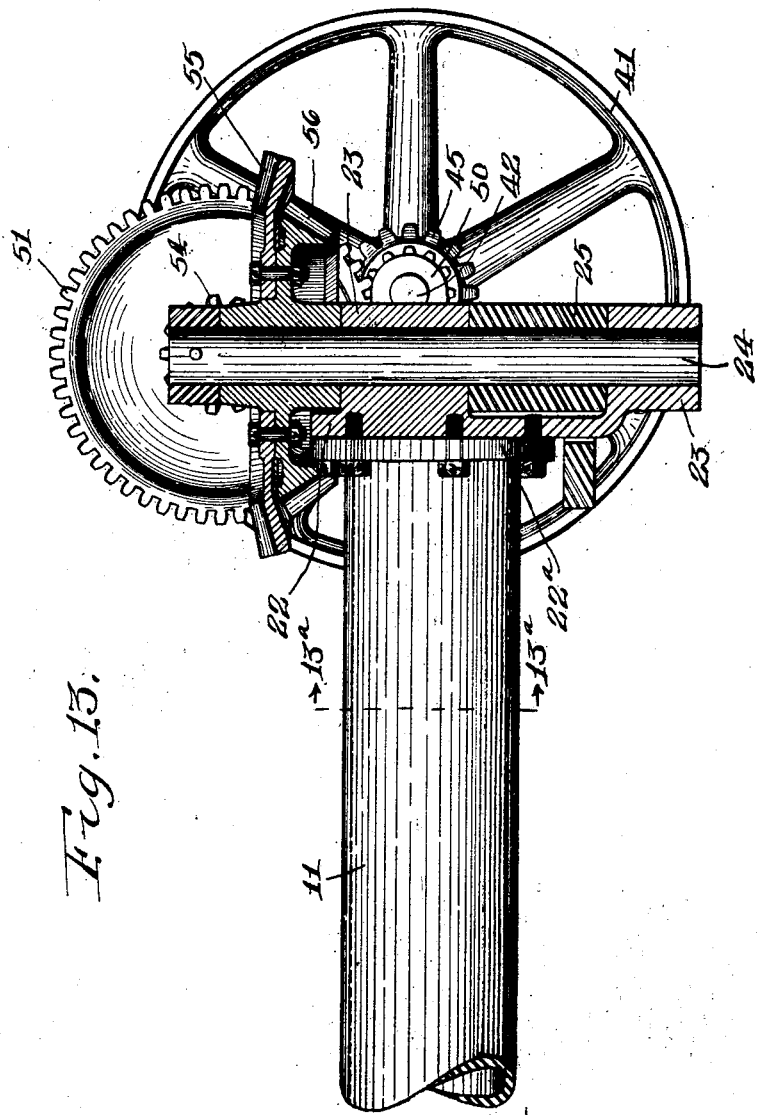
Figure 13 is a detail view of the bracket at the rear end of the beam showing the connection between it and the beam.
Figure 13A:
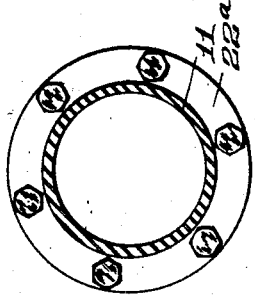

Figure 13$^a$ is a sectional view of the bracket shown in Fig. 13, taken on line 13$^a$—13$^a$, Fig. 13.

Figures 14 and 15 are enlarged detail views of part of the power transmitting mechanism for driving the mechanism of the binder.

Figure 16 is a sectional view on line 16—16, Fig. 14.

I have here shown my invention as applied to a binder comprising a frame 1 supported at its outer side by a caster wheel 2 and having an axle or pivot 3 between its ends, on which is usually mounted the main ground wheel of a horse drawn binder. This frame extends over the main wheel so that the reaper or binder and mower mechanism is supported on one side of this ground wheel and the bundling and binding mechanism on the other side of the ground wheel as will be understood by those skilled in the art.

The mower mechanism includes the finger bar 4 and reciprocating knife 5 and the movable apron, not shown, on which the grain falls when cut and by which it is conveyed to the mechanism mounted on the portion of the frame designated 7. The construction of the binder, per se, forms no part of this invention.

This invention comprises a tractor frame which can be applied to standard binders and which is connectable to the binder frame in place of the main ground wheel mounted upon the spindle or pivot 3. The tractor frame comprises a main lengthwise member, or beam 11 supported at its opposite ends by steering and tractor wheels, and carrying the motor and power transmitting mechanism for driving the tractor wheel.

The beam 11 is here shown as tubular and is provided with the transverse bearing 12 between its ends for receiving the pivot 3 of the binder, the bearing 12 being secured to the beam 11 in any suitable manner as by a split sleeve 13 formed integral with the bearing 12 and clamped on the beam 11 in any suitable manner as by bolts and nuts, the bolts extending through perforated lugs 15 on the split sleeve 13. This sleeve is adjustable lengthwise of the beam 11 to properly position the binder frame.

The beam 11 is also provided with a bracket 16 on the front end thereof having an upwardly and forwardly extending arm 17 in which the fork 18 for the front or steering wheel 19 is mounted, the bracket 16 being in the form of a split sleeve which is clamped onto the beam 11 by bolts and nuts, the bolts 20 passing through perforated lugs 21 on the sleeve 16.

The beam is also provided with a bracket 22 on the rear end thereof formed with vertically alined spaced apart bearings 23, Fig. 12, in which is journaled a shaft 24 having a collar 25 thereon located between the bearings 23 and carrying the spindle 26 about which the tractor wheel 27 rotates. The bracket 22 is bolted to an annular flange or collar 22ª on the beam 11.

The bracket 22 has a laterally extending portion 28 for supporting the power transmitting mechanism to be hereinafter described. The beam 11 is also provided with a bearing 29, Fig. 3, thereon in the form of a split sleeve clamped on the beam 11, the bearing 29 carrying the base of the internal combustion engine 30.

The steering wheel 19, is manually operated by means of a steering post 31, Fig. 4 connected at its front end by a universal joint 32 to a shaft 33 on which is mounted a worm 34 meshing with the segment 35 mounted on the upper end of the spindle of the fork 18. The shaft 33 is journaled in bearings 36 at the front end of the arm 17. The post extends rearwardly to within reach of the seat 37 here shown as carried by the binder frame 1, and has a suitable hand wheel 38 at its rear end.

The motion of the crank shaft of the engine is transmitted to the tractor wheel 27 by means including a belt 39, Figs. 2 and 3, running over pulleys 40 and 41 mounted respectively upon the crank shaft of the engine and on a shaft 42, Fig. 12, journaled in bearings 43, 44 carried by the part 28 of the bracket 22.

The motion is transmitted from the shaft 42 to the tractor wheel 27 by one of a pair of bevel gears 45, 46 loosely mounted upon the shaft 42 and connectable selectively thereto by a clutch section 47, a gear 48 mounted on a shaft 49 journaled in the part 28 of the bracket 22 and arranged at a right angle to the shaft 42, a spur pinion 50 mounted on the shaft 42 and rotatable with the gear 45 and meshing with the gear 51 mounted on a shaft 52 journaled in a bearing 53 provided on the bracket 28, a bevel pinion 54 rotatable with the shaft 52 and meshing with an upwardly facing bevel gear 55 mounted on the shaft 24, and a downwardly facing bevel gear 56 also mounted on the shaft 24 to rotate with the gear 55 and meshing with a bevel gear 57 mounted upon and rotatable with the tractor wheel 27.

The clutch 47 is provided with clutch faces on opposite sides thereof and is shiftable from neutral position into engagement with clutch faces on either of the gears 45 and 46. When the clutch section is shifted into engagement with the gear 45 the power is transmitted to the tractor wheel 27 to rotate the same in a forward direction, the gear 45 then driving the gear wheel 48 which operates and drives the binder as will be hereinafter described.

When the clutch 47 is shifted to connect the gear 46 to the saft 42, the power is transmitted through gears 48, 45, 50, 51, 54, 55, 56 and 57 to the tractor wheel 27 and the tractor wheel is rotated in a retrograde direction.

The clutch 47 is shifted by means of a fork 58 pivoted at 59, and the fork is operated through the link 60 connected to a rock arm 61, on a rock shaft 62 operated by a lever 63, Figs. 4 and 12, extending to within reach of the seat.

The tractor wheel also has a swiveling action for the purpose of turning the machine as illustrated in dotted lines in Figure 1, the swiveling action being effected through the action of the gears 56 and 57 and being controlled by suitable latch mechanism, similar to that described in my Patent No. 1,193,505, August 8, 1916.

Obviously, as the lever 63 is shifted to rock the shaft 62, the clutch 47 will be shifted into engagement with either of the clutch faces on the gears 45, 46.

The mower knife is driven from the gear 48 by mechanism comprising a jointed shaft 64 journaled in suitable bearings 65 carried by the portion 7 of the binder frame 1, a sleeve 66 slidably keyed on the rear end of the shaft 64, a sleeve 67 on the front end of the shaft 49 and connected to the rear end of the sleeve 66 by a universal joint 68, clutch jaws 69 and 70 mounted on the shaft 49 within the sleeve 67 and connected respectively to the shaft 49 and sleeve 67, and a link 71, Fig. 4 connecting the crank arm 71ª on the front end of the shaft 64 to the knife 5 of the mower being pivoted thereto at 71ᵇ.

The sliding motion of sleeves 66 and 67 is against the action of the spring 72 encircling the shaft 64 between a collar 73 thereon and the front end of the sleeve 66.

In operation, during the rotation of the gear 48 by the gear 45, the shaft 49 is turned to the right and the tractor wheel 27 driven forwardly.

The sleeve 67 is moved rearwardly or to the left in Figs. 14 and 15 to engage the clutch jaw 70 with the jaw 69 on the shaft 49, and hence connect the shaft 49 to the shaft 64 to drive the binder.

When the clutch 47 is shifted to lock the gear 46 to the shaft 42 the gear 48 is driven to the left, Fig. 12 and the tractor wheel 27 rotated in a reverse direction to back up or turn the machine, and likewise the shaft 49 and clutch face 69 thereof are rotated to the left and as the teeth of the jaws have ratcheting surfaces, ratchet relatively to the jaw 70 so that no motion is transmitted to the shaft 64 and the mower knife and binder during retrograde movement of the tractor wheel 27.

The mower knife may be disconnected at will from the power actuated mechanism by shifting the sleeve 67 which has the jaw clutch 70 associated therewith, against the action of the spring 72, and as seen in Figs. 2, 4 and 15. This shifting can be effected by means of a shifting lever 74 one arm of which terminates in a fork bearing against the rear end of the sleeve 67 and the other arm of the lever which is connected to a suitable handle located within reach of the seat. Hence, upon movement of the arm 74 to the left in Figs. 2 and 15, the sleeve 67 and clutch 70 will be shifted to disengage the clutch 70 from the clutch 69 so that the mower knife remains idle. Upon the release of the lever 74 the spring 72 will again thrust the clutch 70 into engagement with the clutch 69 so that the mower knife will be again actuated.

The implement or binder frame as before stated, is tiltable about the pivot of the bearing 12 and the caster or grain wheel, this tilting being for the purpose of changing the angle of the knife relatively to the ground as will be understood by those skilled in the art, and the tilting operation is effected by means of a lever 77, Figs. 4 and 7 pivoted at 78 to an upwardly extending arm 79 on the frame 1, and a link 80 connecting the front arm 81 of the lever 77 to the bracket 17 at the front end of the beam 11, the lever having a suitable pawl operated by a grip handle, and coacting with a rack 82 on the arm 79.

The lower end of the link 80 is not connected directly to the bracket 17 but to a laterally extending arm 83 thereon, the link having a laterally turned end or pin 84 at its lower end Fig. 9, which enters an eye at the free end of the arm 83, the link being held from disengagement from the eye by means of a locking piece 85 having a body portion 86 slidable on the link 80 against the action of a suitable spring 87 and also having a portion which interlocks behind a flange 88 provided at the free end of the arm 83.

The binder frame is adjustable vertically in the usual manner, and usually in machines of this type the axle as 3 and the axle on which the castor or grain wheel is mounted are each carried on a slide as the rack 89, Figs. 10 and 11, the slide being mounted in a vertical guide Fig. 11, fixed to the frame. The frame is adjustable along the guide to raise and lower the frame by means of a rack 91 on one side of the slide and suitable mechanism on the frame coacting with such rack.

The spindle 8 for the castor wheel 2 is here shown as mounted upon an arm 93 pivoted at 94 to an arm 95 fixed to the slide 89, the arms 93 and 95 normally being in the form of a fork. During retrograde movement of the machine, as when turning a corner as illustrated in Fig. 1, the wheel 2 casters about the pivot and the arm 93 moves into the position shown in dotted lines, Figs. 1 and 11.

This invention is particularly advantageous in that it provides a particularly simple, strong and compact motor or tractor applicable to standard horse drawn binders and which when applied to the binders do not take up as much room as the binder with the beam attached thereto so that it is possible to run much closer to fences and into corners than with the horse drawn binder.

What I claim is:

1. In a motor agricultural machine, the combination of a main member having a transversely extending bearing between its ends, a single tractor wheel and a steering wheel at opposite ends of the main member, a motor and connections between the motor and the tractor wheel carried by the frame, and an implement frame extending transversely of the main frame and having a spindle journaled in said bearing, means for supporting the outer end of the implement frame in line with the axis of the spindle and connections between the implement frame and the tractor frame to normally hold it from tilting movement and for tilting the implement frame into different angles about the axis of the spindle, substantially as and for the purpose specified.

2. In a motor agricultural machine, the combination of a tractor frame comprising a main member having a transversely extending bearing between its ends, a single tractor wheel and a steering wheel, at opposite ends of the main member, a motor, and connections between the motor and the tractor wheel, an implement frame extending transversely of the tractor frame, and having a spindle journalled in said bearing, means for supporting the outer end of the implement frame in line with the axis of the spindle, comprising a castor wheel having its axis of rotation in line with the axis of the spindle, and connections between the implement frame and the tractor frame to normally hold the implement frame from tilting movement, and for tilting the implement frame to different angles about the axis of the spindle, and the castor wheel.

3. In a motor agricultural machine, the combination of a main member, having a transversely extending bearing between its ends, a single tractor wheel, and a steering wheel at opposite ends of the main member, a motor carried by the member, and connections between the motor and the tractor wheel, an implement frame extending transversely of the main member, and having a spindle journalled in said bearing, a castor wheel supporting the outer end of the implement frame, the castor wheel being normally arranged with its axis of rotation in line with the axis of the spindle.

4. In a motor agricultural machine, the combination of a tractor frame comprising a member, having a transversely extending bearing between its ends, a single tractor wheel connected to the frame to swivel about an upright axis, and a steering wheel at opposite ends of the main frame, the tractor wheel being also shiftable about its upright axis to different angular positions, means controlling such shifting, a motor carried by the frame, connections between the motor and the tractor wheel, an implement frame extending transversely of the main frame, and having a spindle journalled in said bearing, a castor wheel supporting the outer end of the implement frame, and arranged with its axis of rotation normally in line with the axis of the spindle, means for normally holding the castor wheel from castoring, and means for controlling the tilting of the implement frame about the axis of the spindle.

5. In a motor agricultural machine, the combination of a main frame having a transversely extending bearing between its ends, a single tractor wheel, and a steering wheel at opposite ends of the main frame, a motor carried by the frame, connections between the motor and the tractor wheel, an implement extending transversely of the main frame, and having a spindle journalled in said bearing, a castor wheel for supporting the outer end of the implement frame and normally arranged with its axis of rotation in line with the axis of the spindle, means carrying the castor wheel and normally preventing castoring, and permitting castoring thereof, during retrograde movement of the frame, and means for normally holding the implement frame from tilting about the axis of the spindle.

In testimony whereof, I have hereunto signed my name, at Syracuse, in the county of Onondago, and State of New York, this 25th day of July, 1919.

ALEXANDER T. BROWN.